May 13, 1930. M. F. CARR 1,758,906
SEPARABLE SNAP FASTENER ELEMENT
Filed April 18, 1928
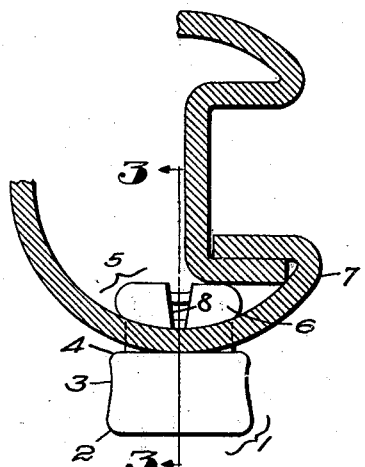
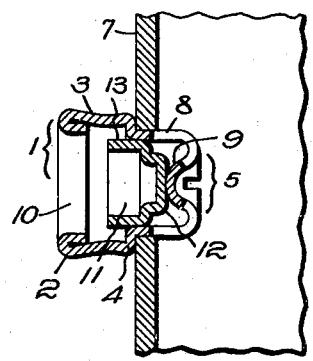
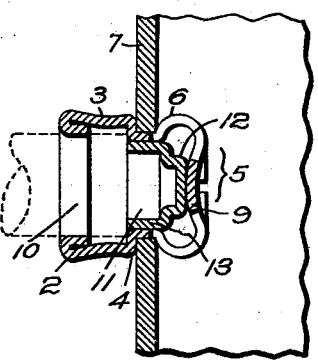
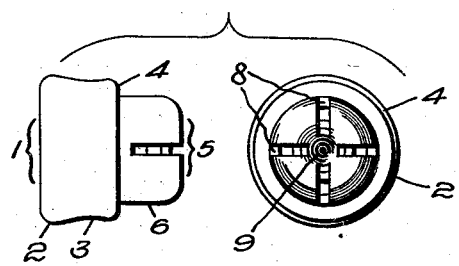
Inventor:
Moses F. Carr,
by Emery, Booth, Janney & Varney
Attys Patented May 13, 1930

1,758,906

UNITED STATES PATENT OFFICE

MOSES F. CARR, OF LEXINGTON, MASSACHUSETTS, ASSIGNOR, BY MESNE ASSIGNMENTS, TO UNITED-CARR FASTENER CORPORATION, OF CAMBRIDGE, MASSACHUSETTS, A CORPORATION OF MASSACHUSETTS

SEPARABLE SNAP-FASTENER ELEMENT

Application filed April 18, 1928. Serial No. 270,913.

My invention aims to provide improvements in separable fasteners and more particularly to fastener elements which are adapted to be secured to sheet metal structures which are inaccessible at their inner faces.

In the drawings, which illustrate a preferred embodiment of my invention:—

Figure 1 is a plan section taken through a portion of a wind shield post showing a snap fastener member secured thereto in accordance with the invention;

Fig. 2 is a section of the fastener member and supporting structure, showing the fastener member before the attaching means has been expanded;

Fig. 3 is a section taken on the line 3—3 of Figure 1; and

Fig. 4 includes a side elevation and a rear elevation, respectively, of a fastener stud member before attachment to a support.

Referring to the embodiment of my invention illustrated by the drawings, I have shown a snap fastener member which is particularly, though not exclusively, adapted for attachment to a relatively thin supporting structure such as sheet metal.

The fastener member shown is provided with a hollow body portion preferably formed from a single piece of sheet metal pressed out to the desired shape. In this instance, I have provided a socket-receiving portion 1 at one end which includes the head portion 2 and neck 3 and the base flange 4 extending directly inwardly from the neck 3. At the other end, I have provided a cup-shaped attaching portion 5 integral with the flange 4 and having an outer peripheral wall 6 which is adapted to be expanded to secure the fastener member to a support 7, as shown in Figs. 1 and 3.

The attaching portion is preferably divided by slits 8 so that the outer wall may be easily expanded. At the bottom of the attaching portion, I have provided an inwardly extending hump 9 which may be flattened to expand the wall 6 in a manner hereinafter described. One end of each of the slits 8 terminates short of the base flange 4 where it joins the wall of the attaching portion (Figs. 2 and 3) so as to prevent the passage of dirt, water or dust when the fastener element is attached to a support, as hereinafter described. The other end of each slit terminates in the hump 9.

At the outer end of the socket-receiving portion 1, the material is bent inwardly so that it extends into the interior of the body portion to provide an aperture 10 through which a tool may be inserted.

Within the fastener body, I have provided an axially movable expanding and closure element 11 which has a hump-engaging portion 12 and a cylindrical portion 13. This closure and expanding element is assembled with the body of the fastener, at the point of manufacture, by simply pressing it through the opening 10 into the position shown in Fig. 2. The cylindrical portion 13 makes a tight fit with the inner face of the wall 6 and therefore cannot fall out of place.

The method of attachment is simple and particularly adapted for securing snap fastener elements to sheet metal objects and for use on objects such as wind shield posts (Fig. 1) the inside of which is not accessible. Furthermore, the attachment is such that only a relatively small space is required beyond the inner face of the object.

When securing a stud unit to a wind shield post, as shown in the drawings, the attaching portion 2 is passed into a pre-formed hole, as shown in Fig. 3. Then a suitable tool (shown in dotted lines in Fig. 3) is pressed against the end of the expanding element 11 to move it axially toward the bottom of the attaching portion, thereby flattening the hump and expanding the attaching portion beyond the inner face of the wall of the post, as shown in Figs. 1 and 3. The cylindrical portion 13 of the expanding element makes a fit with the inner face of the wall of the attaching portion and thereby covers the slits 8 to prevent passage of water, dust or dirt through the fastener to the inside of the post.

By making the attaching portion 5 somewhat resilient it is not necessary to form accurate holes in the objects to which the fastener elements are to be attached. This, of course, is a desirable advantage, because it allows for substantial manufacturing tolerances.

The expanding and closure element 11 shown is pressed from sheet metal. However, it may be made in any other suitable manner.

If at any time it becomes necessary to remove a fastener element, attached to a support in the above-described manner, it is only necessary to drill a hole through the hump-engaging portion 12 and the hump 9 so that a tool may be inserted through the drilled hole to pull the fastener out of the hole in the support.

While I have illustrated and described preferred embodiments of the invention, I do not wish to be limited thereto. Therefore reference should be made to the following claims to indicate the scope of my invention.

I claim:

1. A snap fastener element having fastener-engaging means adjacent to one end thereof, an attaching portion at the other end substantially cup-shaped in cross-section, a hump in the bottom of said attaching portion, slits dividing the side wall and a portion of the bottom of said attaching portion and a cup-shaped closure element assembled within the fastener element and adapted to be moved bodily toward said hump to expand a portion of the peripheral wall of the attaching portion and the wall of the cup-shaped closure element adapted to fit tightly against the inner face of the peripheral wall of the attaching portion to close the slits so that water or dirt cannot pass through the fastener element.

2. A fastener element having a body portion having a stud portion at one end provided with an apertured head, a neck, a base flange extending directly inwardly from said neck and an attaching portion extending from said base flange, said attaching portion being slit to permit ease of expansion, means forming part of the fastener assembly for laterally expanding said attaching portion and closure means within the body portion for closing the slits in the attaching portion so that water or dirt passing into the fastener through the aperture in the stud head will be excluded from passing through the said slits.

3. A snap fastener element having fastener-engaging means adjacent to one end thereof, an attaching portion at the other end having an integral distortable hump in the bottom thereof, an axially movable expanding element located within the fastener element and adapted when moved toward said hump to distort it to expand the peripheral wall of the attaching portion and a drill-guiding depression in said expanding element whereby a drill may be guided to drill out a portion of the expanding element and the hump to permit removal of the fastener element from a support.

4. A snap fastener stud member having an annular flange located between its ends, a head and neck portion located at one side of said flange, means providing a normally open passage through the outer end of the head to the interior of the stud member, a laterally expansible attaching portion located at the other side of the flange, said attaching portion being cup-shaped and having a hump in the bottom thereof extending toward the passage in the head of the stud member, and an axially movable member normally assembled within the stud member and adapted to be pressed against the hump to flatten it and expand the wall of the attaching portion.

5. A snap fastener stud member having an annular flange located between its ends, a head and neck portion located at one side of said flange, means providing a normally open passage through the outer end of the head to the interior of the stud member, a laterally expansible split attaching portion located at the other side of the flange, said attaching portion being cup-shaped and having a hump in the bottom thereof extending toward the passage in the head of the stud member, and an axially movable member normally assembled within the stud member and adapted to be pressed against the hump to flatten it and expand the wall of the attaching portion, said axially movable element having a portion for engagement with the inner surface of the annular wall of the attaching portion to close the slits against the passage of water or dirt.

In testimony whereof, I have signed my name to this specification.

MOSES F. CARR.